United States Patent [19]

Morgan

[11] Patent Number: 5,347,800
[45] Date of Patent: Sep. 20, 1994

[54] APPARATUS FOR HARVESTING, PRUNING, AND/OR TRIMMING

[76] Inventor: Robert K. Morgan, 42 Garden Dr., Fairfield, Conn. 06430-3330

[21] Appl. No.: 77,278

[22] Filed: Jun. 17, 1993

[51] Int. Cl.$^5$ .......................................... A01D 46/22
[52] U.S. Cl. ....................................... 56/335; 56/332
[58] Field of Search ............... 56/241, 328.1, 333, 56/335, 336, 329, 332; 30/238, 246, 248, 249

[56] References Cited

U.S. PATENT DOCUMENTS

| | | |
|---|---|---|
| 938,355 | 10/1909 | Virgin .................................. 56/335 |
| 971,925 | 10/1910 | Petertyl .............................. 56/335 |
| 1,295,888 | 3/1919 | Gerrish ............................... 56/335 |
| 1,370,208 | 3/1921 | Halicki ............................... 56/335 |
| 1,579,052 | 3/1926 | Altvater .............................. 56/335 |
| 1,801,675 | 4/1931 | Maguire .............................. 56/335 |
| 1,844,158 | 2/1932 | Hain ................................... 56/335 |
| 2,415,648 | 2/1947 | Marvin ............................... 56/335 |
| 2,746,232 | 5/1956 | Ossino ................................ 56/336 |
| 2,968,907 | 1/1961 | Bernheim et al. ................. 56/332 |
| 2,990,668 | 7/1961 | Brendel .............................. 56/333 |
| 3,507,107 | 4/1970 | Harms et al. ...................... 56/336 |
| 3,744,227 | 7/1973 | Kerner ............................... 56/335 |
| 3,952,488 | 4/1976 | Coulter .............................. 56/333 |
| 3,998,038 | 12/1976 | Root .................................. 56/336 |
| 4,060,962 | 12/1977 | Cooper .............................. 56/336 |
| 4,835,955 | 6/1989 | Gaubis ............................... 56/333 |
| 5,083,418 | 1/1992 | Reece ................................ 56/335 |
| 5,142,854 | 9/1992 | Chua ................................. 56/335 |

FOREIGN PATENT DOCUMENTS

| | | |
|---|---|---|
| 2628935 | 9/1989 | France .............................. 30/249 |
| 84493 | 11/1954 | Norway . |
| 209281 | 6/1940 | Switzerland . |

*Primary Examiner*—Ramon S. Britts
*Assistant Examiner*—James A. Lisehora
*Attorney, Agent, or Firm*—John H. Crozier

[57] ABSTRACT

In a preferred embodiment, an apparatus for harvesting produce, pruning, trimming, or the like, the apparatus including: an elongate tubular member; a cutting assembly disposed at the distal end of the elongate tubular member, the cutting assembly being selectively positionable such that the plane of cutting thereof can form an acute angle with the major axis of the elongate tubular member either above or below the major axis; and a first actuating members spaced apart from the distal end of the tubular member such as to remotely actuate the cutting assembly.

14 Claims, 7 Drawing Sheets

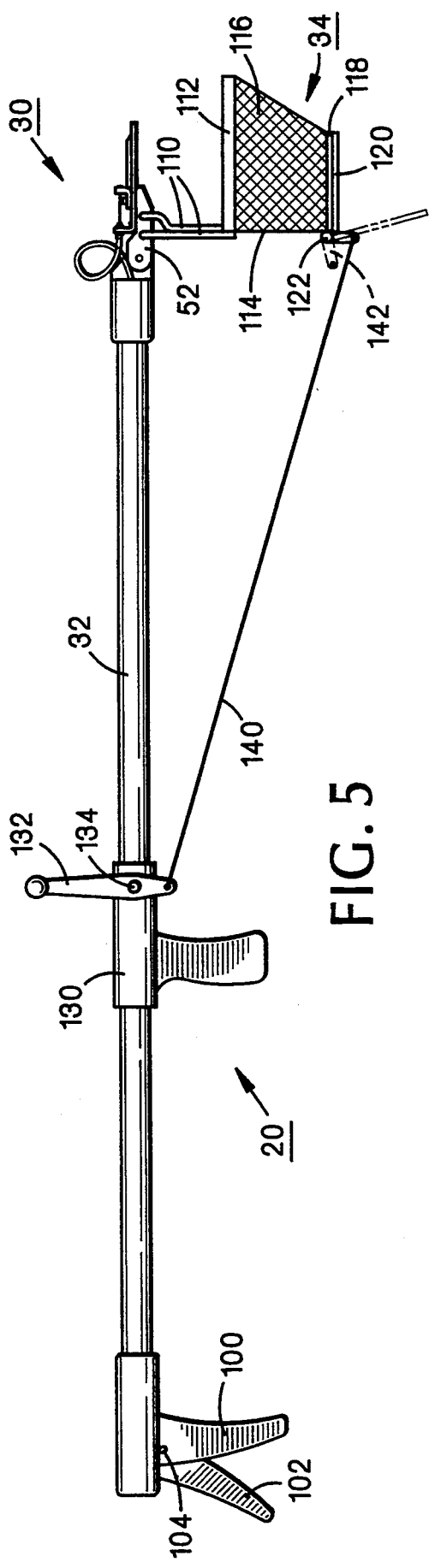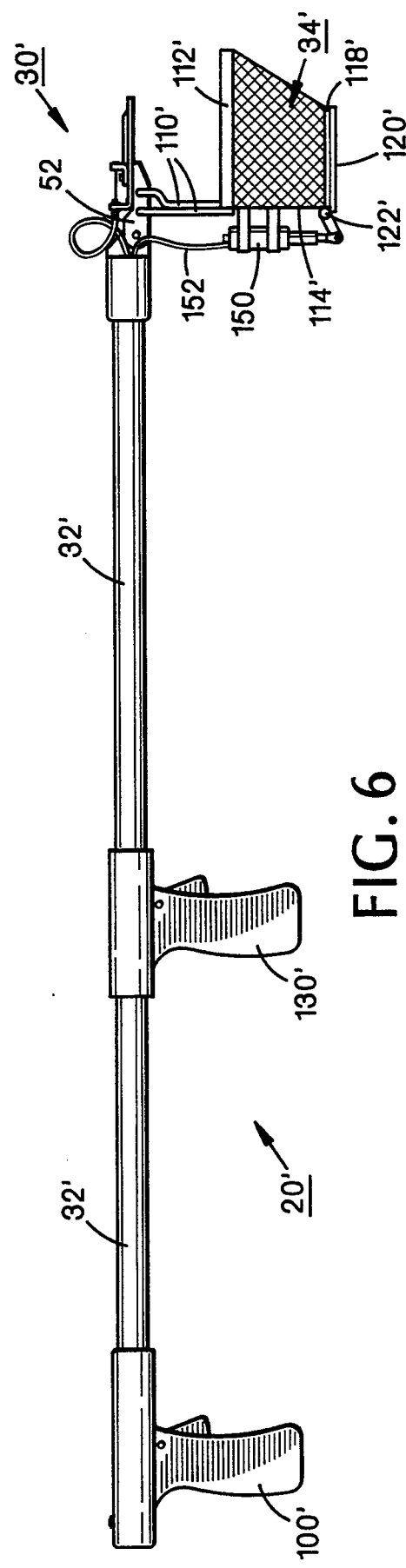

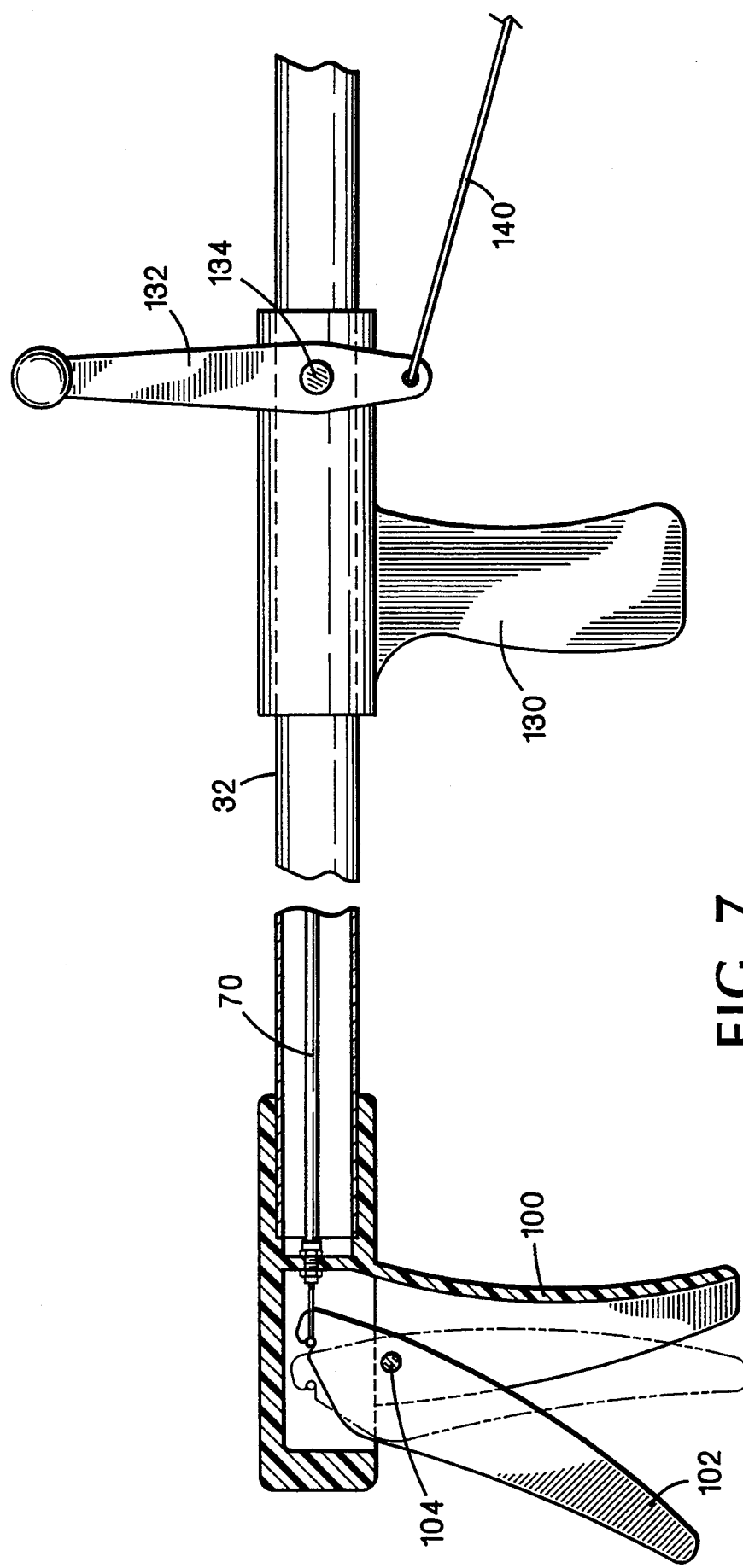

APPARATUS FOR HARVESTING, PRUNING, AND/OR TRIMMING

BACKGROUND OF THE INVENTION

1. Field of the Invention.

The present invention relates, but not by way of limitation, to garden, orchard, and landscaping devices generally and, more particularly, to a novel apparatus for harvesting, pruning, and/or trimming or the like.

2. Background Art.

The commercial grower, farmer, and home gardener are all faced with the problem of harvesting fruits and vegetables and pruning and trimming trees, shrubs, and grass. Mainly, this task is done by hand, or with existing tools that are labor intensive or that damage the plants and/or produce. The harvesting problem is especially difficult for a person with a disability, who is handicapped, or is prone to fatigue and/or sore muscles from reaching, bending, kneeling, and/or stooping. Even for an able bodied person, harvesting produce by hand can be difficult because of the height of the produce or the produce may be rendered somewhat inaccessible due to vines, trellises, fences, or the like.

Similar problems exist when a person desires to prune or trim trees, shrubs, or grass, since the loci of such operations are usually either low or high relative to the persons arms and the operations require excessive stooping or bending or reaching overhead.

Accordingly, it is a principal object of the present invention to provide and apparatus for harvesting, pruning, trimming, or the like that is easily operated.

It is a further object of the invention to provide such an apparatus that can be easily operated manually.

It is an additional object of the invention to provide such an apparatus that can be operated electrically.

It is another object of the invention to provide such an apparatus that permits convenient discharge of harvested produce.

Yet a further object of the invention is to provide such a device that is of simple construction and economically manufactured.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for harvesting produce, pruning, trimming, or the like, comprising an elongate tubular member; a cutting assembly disposed at the distal end of said elongate tubular member, said cutting assembly being selectively positionable such that the plane of cutting thereof can form an acute angle with the major axis of said elongate tubular member either above or below said major axis; and first actuating means spaced apart from said distal end of said tubular member such as to remotely actuate said cutting assembly.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIG. 5 is a side elevational view of the embodiment of FIG. 1.

FIG. 6 is a side elevational view of an alternative embodiment of the present invention.

FIG. 7 is a fragmentary, side elevational view, partially in cross-section, of the proximal end of the embodiment of FIG. 1.

DETAILED DESCRIPTION OF THE PREFERRED EMBODIMENTS

Figure 1:
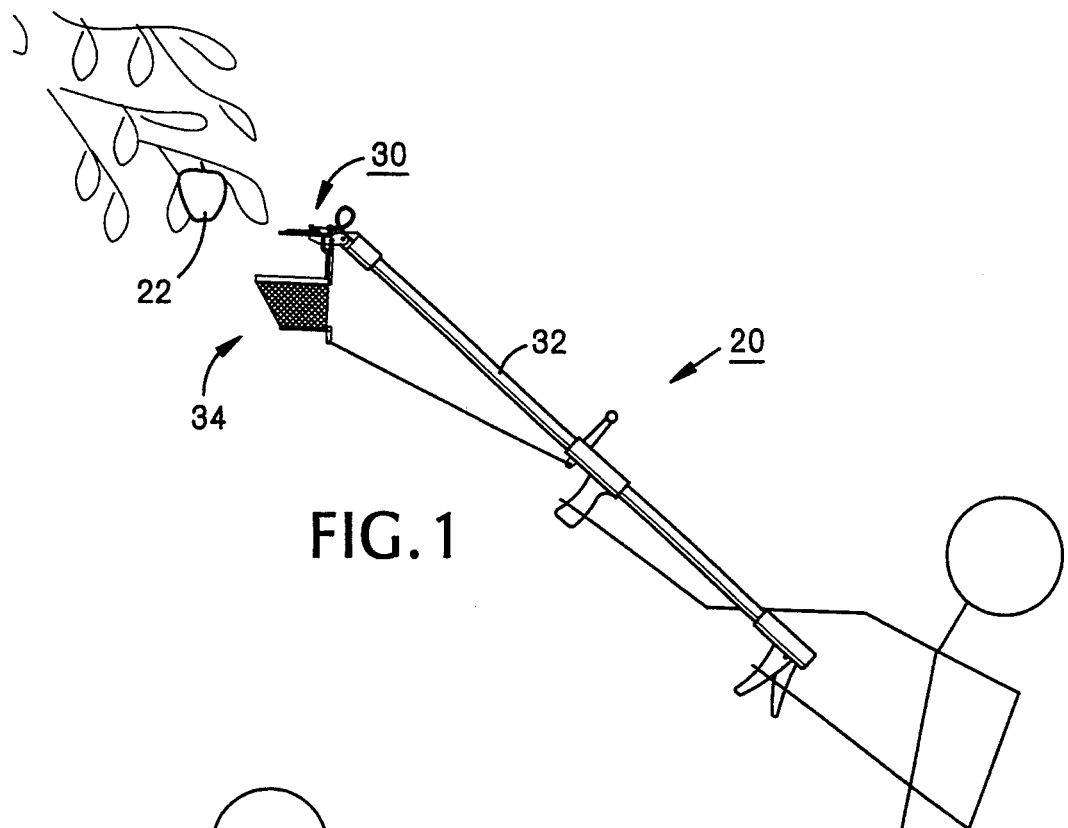
FIG. 1 is a side elevational view of one embodiment of an apparatus according to the present invention being used in an overhead operation.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 2:
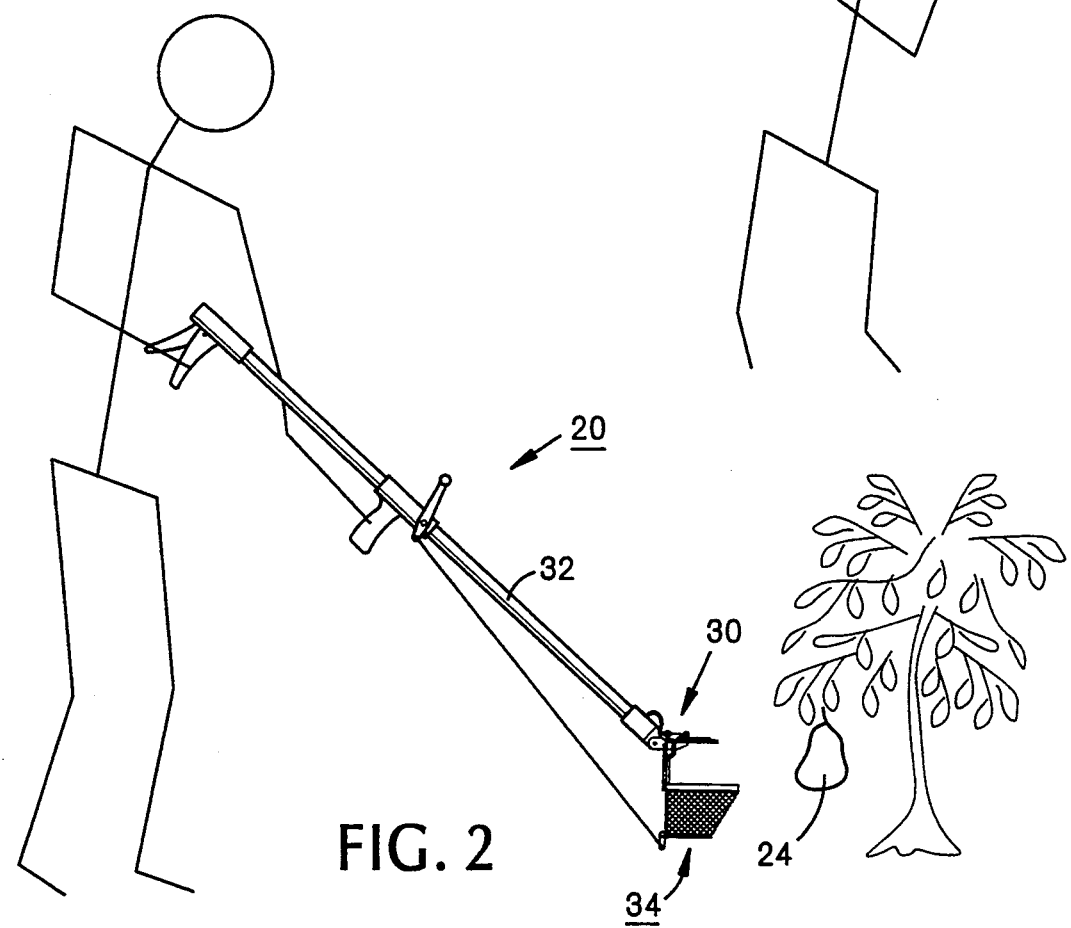
FIG. 2 is a side elevational view of the embodiment of FIG. 1 being use in a near ground operation.

FIG. 1 illustrates an apparatus, generally indicated by the reference numeral 20, according to one embodiment of the present invention, arranged to harvest an item of produce 22 in an overhead position. FIG. 2 illustrates apparatus 20 arranged to harvest an item of produce 24 in a low position. On FIG. 1, the plane of cutting of cutting assembly 30 is such that the plane of cutting forms an acute angle with the major axis of tubular member 32 below the major axis, while, on FIG. 2, the plane of cutting of the cutting assembly is such that the plane of cutting forms an acute angle with the major axis of the tubular member above the major axis.

While details of apparatus 20 will be described in detail below, it should be noted that a cutting assembly, generally indicated by the reference numeral 30, is disposed at the distal end of an elongate tubular member 32 and that a removable basket assembly, generally indicated by the reference numeral 34, is attached to the distal end of the tubular member and underlies the cutting assembly. It can be seen that, when apparatus 20 is located so that cutting assembly 30 is positioned so as to sever the stems supporting produce items 22 and 24, the severed produce items will fall by gravity into basket assembly 34.

Figure 3:
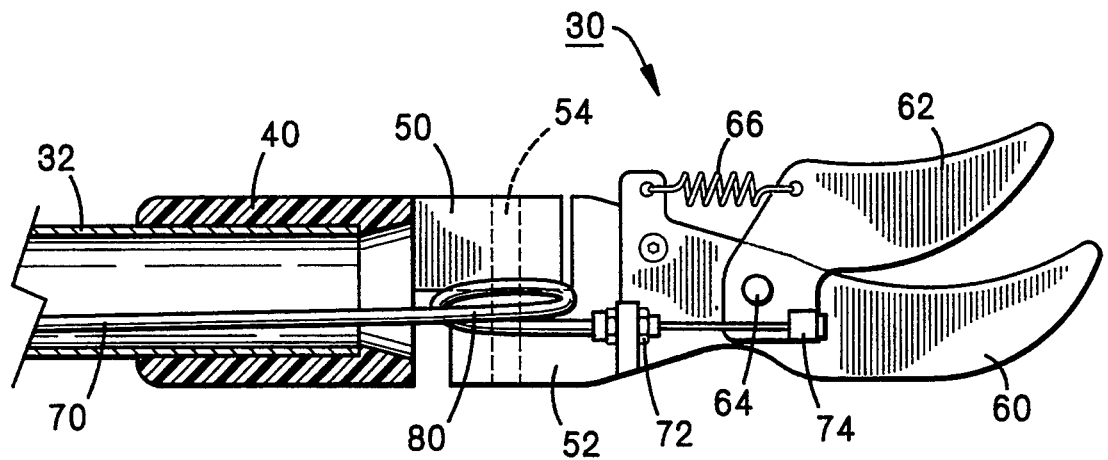
FIG. 3 is a fragmentary top plan view, partially in cross-section, of the distal end of an apparatus of the present invention.
Figure 4:
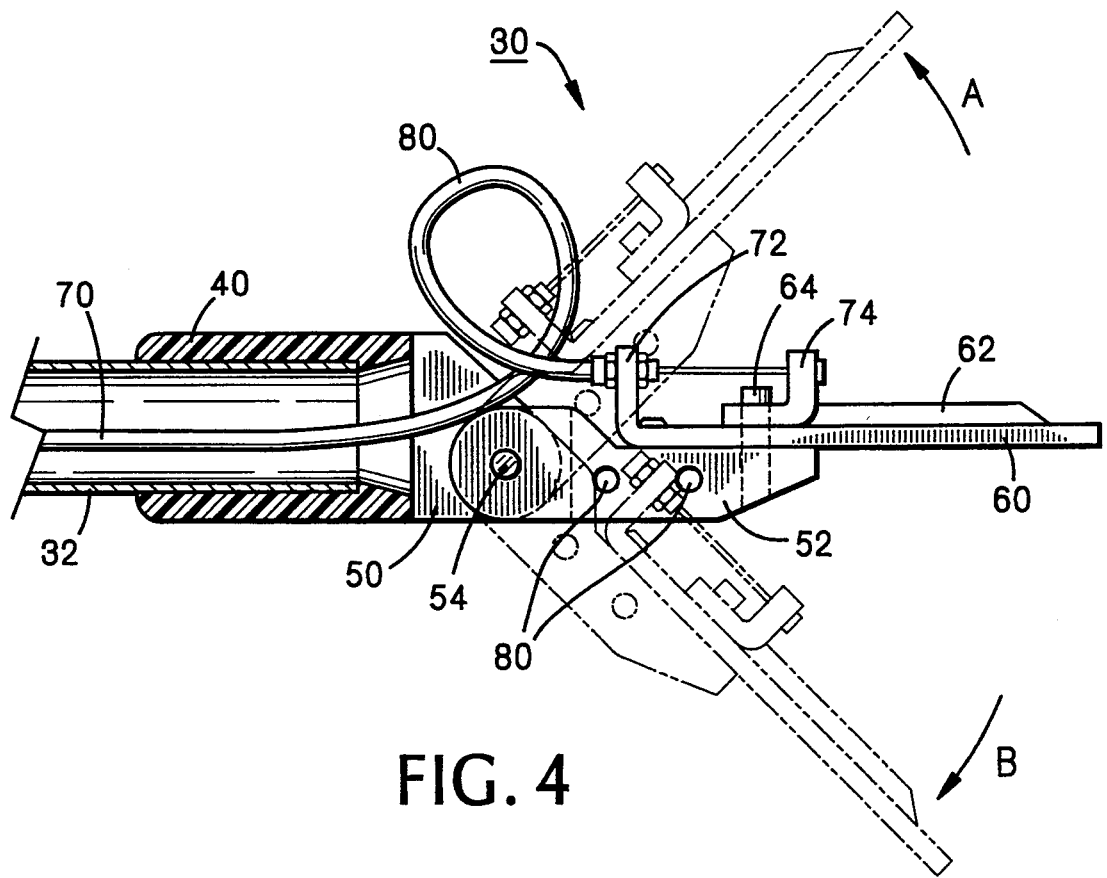
FIG. 4 is a side elevational view, partially in cross-section, of the distal end of the apparatus.

Reference should also be made now to FIGS. 3 and 4 which illustrate the construction of cutting assembly 30. Cutting assembly 30 includes a collar 40 for mounting the cutting assembly to the distal end of tubular member 32. A first, vertical flange 50 is fixedly attached to and extends horizontally from collar 40. A second, vertical flange 52 is mounted to first flange 50 by means of a horizontal shaft 54, such that the distal end of second flange 52 may be rotated vertically with respect to the distal end of tubular member 32.

Fixedly attached to second flange 52 is a horizontal, fixed, first cutting blade 60. A horizontal, second cutting blade 62 is rotatably mounted to fixed cutting blade 60 by means of a vertical shaft 64 disposed at the proximal ends thereof. Cutting blades 60 and 62 are biased to the open position shown on FIG. 3 by means of a coil spring 66 extending therebetween.

A sheathed cable 70 extends through tubular member 32, with the distal end of the sheath portion thereof terminating at a clamp 72 on fixed blade 60, while the distal end of the cable portion thereof terminates at a clamp 74 on movable blade 62. So arranged, movement of the cable portion of sheathed cable 70 to the left on FIGS. 3 and 4 will cause movable blade 62 to slide over fixed blade 60 in cutting relationship (not shown), while stretching coil spring 66.

Shaft 54 may engage first and second flanges 50 and 52 with sufficient friction, or conventional detent means may be provided, such that cutting assembly 30 may be selectively held in the position shown in solid lines on FIG. 4. Cutting assembly 30 may also be manually rotated a desired degree in the direction indicated by the arrow "A" on FIG. 4 to, and held in, the upper position shown in broken lines, corresponding to the configuration of apparatus 20 shown on FIG. 2. Alternatively, cutting assembly 30 may also be manually rotated a desired degree in the direction indicated by the arrow "B" on FIG. 4 to, and held in, the lower position shown in broken lines, corresponding to the configuration of apparatus 20 shown on FIG. 1. A loop 80 is provided in sheathed cable 70 to as to permit the rotation of cutting assembly 30 without impairing the functioning thereof.

Second flange 52 includes mounting holes 80 defined therethrough for the mounting thereto of basket assembly 34 (FIGS. 1 and 2).

Reference also now to FIGS. 5 and 7 will reveal further details of the operation of the embodiment of the invention shown on FIGS. 1–4. At the proximal end of tube member 32 is fixedly disposed a hand grip 100 having therein an operating lever 102 (FIG. 7) which is rotatable about a shaft 104 fixed to the hand grip. Also within hand grip 100, the proximal end of sheathed cable 70 is fixedly mounted, while the proximal end of the cable portion is attached to the upper end of operation lever 102 above shaft 104. It can be seen that counterclockwise rotation of operating lever 102 will draw the cable portion of sheathed cable 70 to the left, thus rotating movable cutting blade 62 (FIG. 3) to its cutting position.

Referring especially to FIG. 5, basket assembly 34 includes two mounting rods 110 the distal ends of which are inserted into mounting holes 80 (FIG. 4) in second flange 52. The proximal ends of mounting rods 110 are attached to an upper frame member 112 and a vertical rear frame member 114. Mesh material 116 depends from upper frame member 112 and terminates at a lower frame member 118, with a bottom member 120 lying against the lower frame member. Bottom member 120 is rotatably held in position by means of a spring loaded hinge 122 attached to the bottom member and to vertical rear frame member 114. The arrangement thus forms an open top basket into which severed produce items 22 and 24 (FIGS. 1 and 2) may fall.

An intermediate grip 130 (FIG. 7) is disposed on tubular member 32 to act as a stabilizer and support for a person using apparatus 20, such that apparatus 20 may be conveniently handled as shown on FIGS. 1 and 2. Intermediate grip 130 assists in preventing fatigue and injury. An operating lever 132 is rotatably mounted to a shaft 134 on intermediate grip 130. A rod 140 has one end attached to operating lever 132 below shaft 134 and the other end attached to a flange 142 on hinge 122 (FIG. 5), such that clockwise rotation of operating lever 132 will rotate bottom 120 about hinge 122 so as to open the bottom of basket assembly 34 and discharge therefrom produce held therein.

Figure 8:
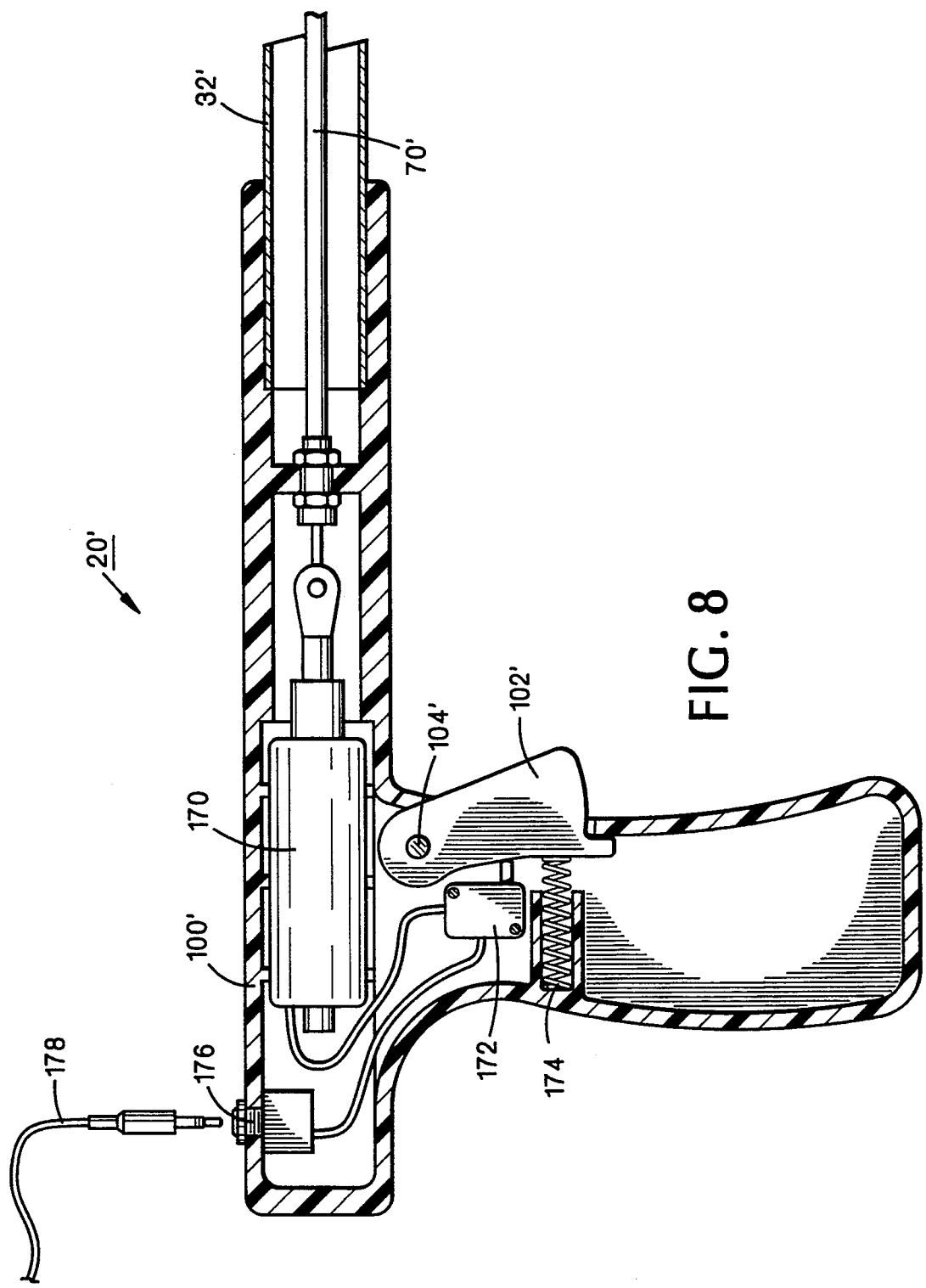
FIG. 8 is a fragmentary, side elevational view, partially in cross-section, of the proximal end of the embodiment of FIG. 6.
Figure 10:
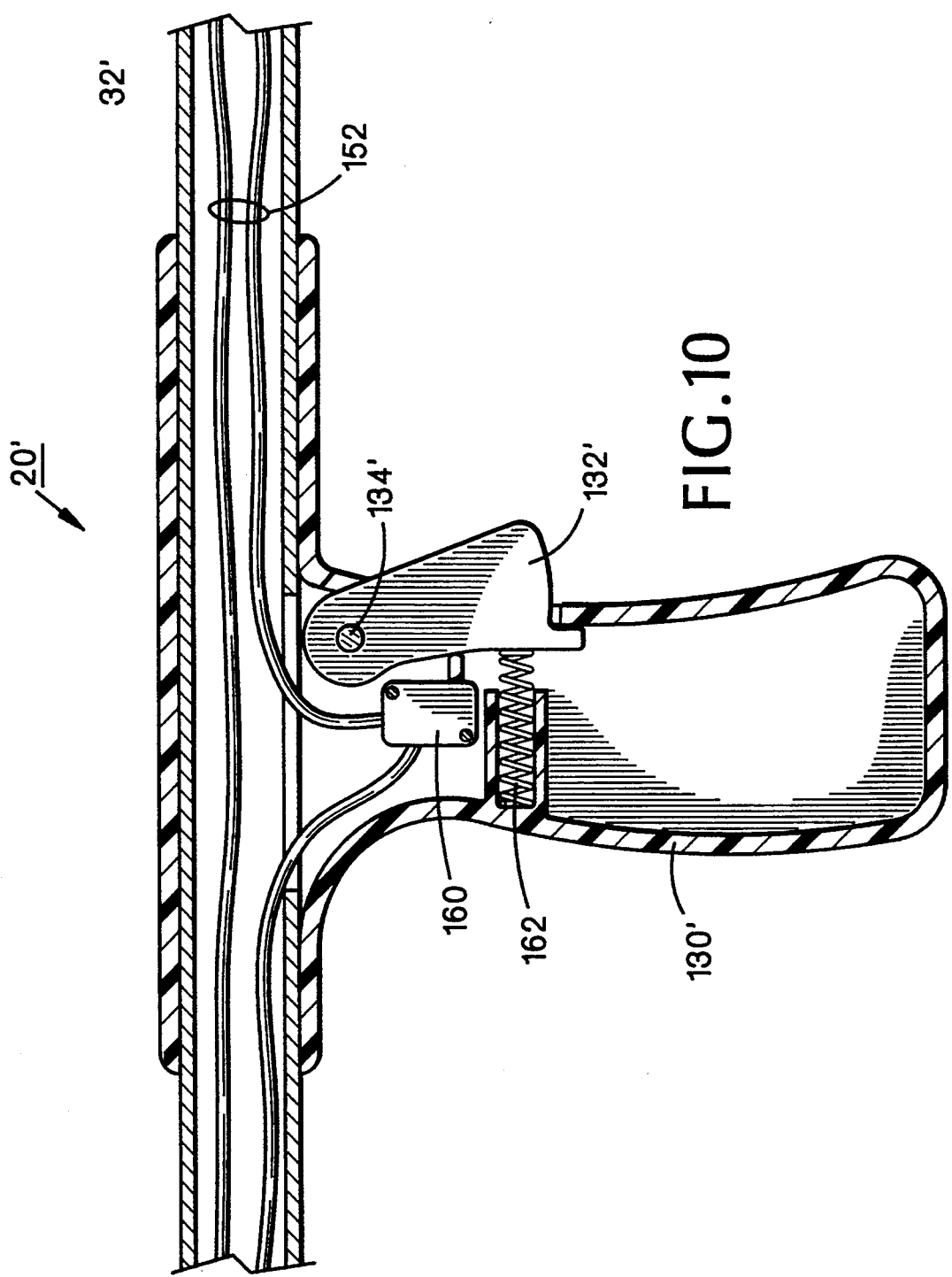
FIG. 10 is a fragmentary, side elevational view, partially in cross-section, of an intermediate portion of the embodiment of FIG. 6.

FIGS. 6, 8, and 10 illustrate an apparatus which is an electromechanical embodiment of the present invention, generally indicated by the reference numeral 20'. Elements of the embodiment shown which are similar or identical to those of apparatus 20 above are given primed reference numerals.

Referring first to FIG. 6, the structure of cutting assembly 30' is identical to cutting assembly 30 on FIGS. 1–5. The operation of basket assembly 34' is similarly identical to that of basket assembly 34 on FIGS. 1–5, except that opening of bottom 120' of basket assembly 34' is effected by means of an electrical solenoid 150 mounted on vertical frame member 114'. Solenoid 150 receives operating power through an electrical cable 152 extending from the distal end of tubular member 32'.

Referring now to FIG. 10, apparatus 20' includes intermediate grip 130' which has mounted therein a normally open microswitch 160. Microswitch 160 is closed by means of manually rotating operating lever 132' clockwise, while the microswitch is maintained in its open position by means of a biasing coil spring 162. Closing of microswitch 160 provides electrical power to solenoid 150 (FIG. 6) to open bottom 120'. Electrical power to microswitch 160 is provided from cable 178 (FIG. 8).

Referring now to FIG. 8, handle grip 100' has mounted therein a solenoid 170 connected to a normally open microswitch 172. The core of solenoid 170 is attached to the cable portion of sheathed cable 70', such that withdrawal of the core into the solenoid will result in cutting assembly 30' moving to its cutting position, similar to the operation of cutting assembly 30 shown on FIGS. 1–5. Clockwise rotation of operating lever 102' closes microswitch 172, thus supplying electrical power to solenoid 170. Microswitch 172 is held in the open position by means of a biasing coil spring 174. Solenoid 170 and microswitch 172 are wired to a receptacle 176 for receipt of electrical power through a cable 178 which may be attached, for example, to a power pack (not shown) worn by the user of apparatus 20'.

Figure 9:
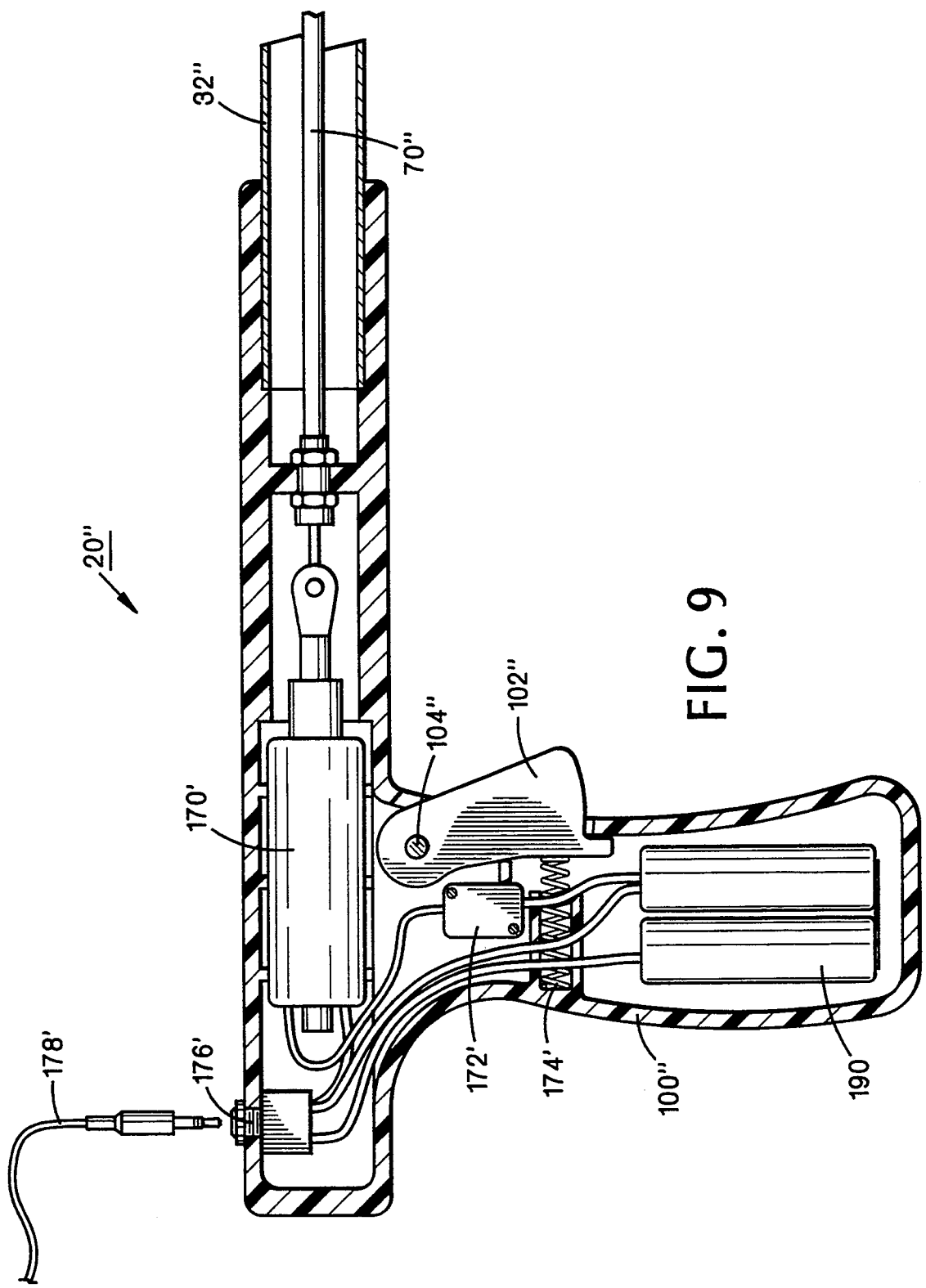
FIG. 9 is a fragmentary, side elevational view, partially in cross-section, of the proximal end of a variation of the embodiment of FIG. 6.

FIG. 9 illustrates an alternative of the electromechanical embodiment shown on FIG. 8. Here, handle grip 100" includes therein a rechargeable battery pack 190 which may be used for complete portability of an apparatus 20". Apparatus 20" may also be used while battery pack 190 is being charged through cable 178' and the battery pack may, alternatively, be of the type that is removed from handle grip 100" for charging.

In use, cutting assembly 30 is rotated about the distal end of tubular member 32 to the desired angle with respect thereto. In the position shown on FIG. 1, apparatus 20 may be used with basket assembly 34 to harvest produce overhead or the apparatus may be used with or without basket assembly 34 to perform overhead trimming or pruning operations on shrubs or trees. With cutting assembly 32 rotated to the position shown on FIG. 2, apparatus 20 may be used with basket assembly 34 to harvest produce near the ground or the apparatus may be used with or without basket assembly 34 to perform pruning or trimming of shrubs or grass near the ground.

In any case, each cutting operation is easily performed by pressing lever 102 (FIG. 5). When basket assembly 34 is full, it can be easily emptied into a receptacle (not shown) by rotating lever 132.

Thus, apparati 20 and 20' reduce the labor intensive effort required to harvest certain kinds of produce and to perform certain trimming and pruning operations.

Apparati 20 and 20' can be economically constructed by conventional methods from suitable metal and polymeric materials.

The length of tubular member 32 will be selected to accommodate the primary use for apparatus 20 and the size of basket assembly 34 will also be selected depending on the primary use. Similar considerations will be given to the selection of the size of cutting assembly 30.

Apparatus 20 may also be equipped with a shoulder stock and/or sling, similar to those used on long firearms, to provide additional stability and ease of use.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for harvesting produce, pruning, trimming, or the like, comprising:
   (a) an elongate tubular member having a major axis and proximal and distal ends;
   (b) a cutting assembly disposed at said distal end of said elongate tubular member and having a cutting plane, said cutting assembly being selectively positionable such that said cutting plane can form an acute angle with said major axis of said elongate tubular member either above or below said major axis;
   (c) first actuation means spaced apart from said distal end of said tubular member such as to remotely actuate said cutting assembly;
   (d) a basket assembly disposed below said cutting assembly such that material cut by said cutting assembly can fall by gravity into said basket assembly;
   (e) said basket assembly having a hinged bottom rotatable from a first position closing said basket so as to retain said material therein and a second position opening said basket so as to permit said material therein to fall therefrom; and
   (f) second actuating means spaced apart from said bracket assembly to remotely caused rotation of said bottom between said first and second positions.

2. An apparatus, as defined in claim 1, further including a handle at said proximal end of said elongate tubular member in which said handle said first actuating means is disposed.

3. An apparatus, as defined in claim 1, wherein said first actuating means is mechanically operated.

4. An apparatus, as defined in claim 1, wherein said first actuating means is electromechanically operated.

5. An apparatus, as defined in claim 1, wherein said second actuating means is mechanically operated.

6. An apparatus, as defined in claim 1, wherein said second actuating means is electromechanically operated.

7. An apparatus, as defined in claim 1, wherein said second actuating means is disposed in a handle disposed in an intermediate position on said elongate tubular member, said handle extending generally generally orthogonally from said elongate tubular member.

8. An apparatus for harvesting produce, pruning, trimming, or the like, comprising:
   (a) an elongate tubular member having proximal and distal ends;
   (b) a cutting assembly disposed at said distal end of said elongate tubular member;
   (c) first actuating means spaced apart from said distal end of said tubular member such as to remotely actuate said cutting assembly;
   (d) a basket assembly disposed below said cutting assembly such that material cut by said cutting assembly can fall by gravity into said basket assembly;
   (e) said basket assembly having a hinged bottom rotatable from a first position closing said basket so as to retain said material therein and a second position opening said basket so as to permit said material therein to fall therefrom; and
   (f) second actuating means spaced apart from said basket assembly to remotely cause rotation of said bottom between said first and second positions.

9. An apparatus, as defined in claim 8, further including a first handle at the proximal end of said elongate tubular member in which said first handle said first actuating means is disposed.

10. An apparatus, as defined in claim 8, wherein said first actuating means is mechanically operated.

11. An apparatus, as defined in claim 8, wherein said first actuating means is electromechanically operated.

12. An apparatus, as defined in claim 8, wherein said second actuating means is mechanically operated.

13. An apparatus, as defined in claim 8, wherein said second actuating means is electromechanically operated.

14. An apparatus, as defined in claim 8, a second handle in an intermediate position on said elongate tubular member in which said second handle said second actuating means is disposed.

* * * * *